(12) United States Patent
Sasaki et al.

(10) Patent No.: US 11,679,772 B2
(45) Date of Patent: Jun. 20, 2023

(54) DRIVE CONTROL SYSTEM FOR VEHICLE

(71) Applicant: Mazda Motor Corporation, Hiroshima (JP)

(72) Inventors: Kazuo Sasaki, Aki-gun (JP); Kazuki Kawamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 408 days.

(21) Appl. No.: 16/935,668

(22) Filed: Jul. 22, 2020

(65) Prior Publication Data

US 2021/0031781 A1 Feb. 4, 2021

(30) Foreign Application Priority Data

Jul. 31, 2019 (JP) .............................. JP2019-141541

(51) Int. Cl.
*B60W 40/00* (2006.01)
*B60W 40/09* (2012.01)
*B60W 10/06* (2006.01)
*B60W 50/08* (2020.01)
B60K 26/02 (2006.01)

(52) U.S. Cl.
CPC ............ *B60W 40/09* (2013.01); *B60W 10/06* (2013.01); *B60W 50/08* (2013.01); *B60K 2026/026* (2013.01); *B60W 2540/103* (2013.01); *B60W 2540/30* (2013.01)

(58) Field of Classification Search
CPC ... B60W 2050/0094; B60W 2050/065; B60W 2050/0039; B60W 2050/004; B60W 2050/0041; B60W 2050/0042; B60W 2510/087; B60W 2510/244; B60W 2540/10; B60W 2540/12; B60W 2555/20; B60W 2710/0666; B60W 2710/083; B60W 20/10; B60W 30/18; Y02T 10/62; Y02T 10/72

See application file for complete search history.

(56) References Cited

U.S. PATENT DOCUMENTS 4,226,141 A * 10/1980 Espenschied ............ F02M 7/24
477/109
4,648,473 A * 3/1987 Bergner .................. B60L 50/52
180/65.8

(Continued)

FOREIGN PATENT DOCUMENTS

JP 2010167982 A 8/2010

*Primary Examiner* — Jacob M Amick
*Assistant Examiner* — Sherman D Manley
(74) *Attorney, Agent, or Firm* — Alleman Hall Creasman & Tuttle LLP

(57) ABSTRACT

A drive control system is provided, which is mounted on a vehicle configured to travel by operation of a driver. The drive control system includes an actuator configured to output a driving force for the vehicle to travel, an output sensor configured to detect a driving force requested by the operation of the driver, and a control device configured to control operation of the actuator based on the requested driving force detected by the output sensor. The control device sets a target output value by adding a given delay time to a requested output value set corresponding to the requested driving force, and controls the actuator so as to output the target output value based on a response characteristic of the actuator.

19 Claims, 9 Drawing Sheets

(56) References Cited

U.S. PATENT DOCUMENTS

| | | | | |
|---|---|---|---|---|
| 5,172,785 A | * | 12/1992 | Takahashi | B60T 7/12 |
| | | | | 706/900 |
| 6,575,257 B1 | * | 6/2003 | Ikkai | B60L 15/10 |
| | | | | 318/434 |
| 2010/0289273 A1 | * | 11/2010 | Steele | F25B 49/025 |
| | | | | 290/40 B |

* cited by examiner

DRIVE CONTROL SYSTEM FOR VEHICLE

TECHNICAL FIELD

The disclosed technology relates to a drive control system for a vehicle, and particularly to a technology which improves driving feel.

BACKGROUND OF THE DISCLOSURE

JP2010-167982A discloses a technology for a hybrid automobile which is driven by an engine and a motor in which an electronic control unit (ECU) carries out an advance compensation control of acceleration by using a drive motor for improving the driver's acceleration feel.

In detail, the ECU sets a target vehicle acceleration according to an accelerator pedal operation, and performs a tracking control so that the acceleration conforms to an acceleration waveform of the target vehicle acceleration. Since the engine output is low in responsiveness, a tracking delay occurs, and which results in insufficient acceleration. Thus, by carrying out a torque assistance using a drive motor which is high in responsiveness to compensate the acceleration insufficiency, the driver's acceleration feel is improved.

Since the technology of JP2010-167982A carries out the tracking control to reach the target vehicle acceleration, the driving feel may vary due to external causes, even if the accelerator pedal operation does not change. For example, when the temperature of the drive motor changes, the outputted acceleration varies, and therefore, the driving feel varies.

As for the senses of the driver, a gradual change over time is not generally noticed even if the change is somewhat large, but a sudden change is easily noticed even if the change is slight. Therefore, such a variation in the driving feel may give a sense of discomfort to the driver.

SUMMARY OF THE DISCLOSURE

One purpose of the disclosed technology is to provide a control system for a vehicle, which is capable of realizing a more comfortable driving experience by improving a driving feel.

The disclosed technology relates to a drive control system mounted on a vehicle configured to travel by operation of a driver.

According to one aspect of the present disclosure, the drive control system includes an actuator configured to output a driving force for the vehicle to travel, an output sensor configured to detect a driving force requested by the operation of the driver, and a control device configured to determine a response characteristic of the actuator, and control operation of the actuator based on the requested driving force detected by the output sensor. The control device sets a target output value by adding a given delay time to a requested output value set corresponding to the requested driving force, and controls the actuator so as to output the target output value based on the response characteristic of the actuator.

There is a temporal limit (cognitive limit) in a person's cognitive capability. Within a range of the cognitive limit, the variation in the driving feel as described above cannot be recognized (a person cannot recognize the existence of the shift). The present inventors focus on such a perspective, and utilize such a sense of a person for the drive control system.

That is, in the drive control system, the requested output value set corresponding to the requested driving force is not used as the target output value as-is, but the given delay time is added to the requested output value. Thus, the target output value which is delayed from an operation timing of an accelerator pedal, etc. is set.

If the delay time is set within the range of the cognitive limit, the delay from the operation timing by the delay time cannot be recognized. Therefore, it is the same as "no delay." Moreover, even if the delay time is outside the range of the cognitive limit, when the delay amount from the operation timing is always the same, the driver is unlikely to feel discomfort from this delay. Therefore, also in such a case, a good driving feel can be maintained unless the amount of shift becomes considerably large.

Therefore, in the drive control system, the actuator, such as an engine, is controlled using the delay time so that the target output value is always fixed based on a response characteristic of the actuator. As a result, the variation in the driving feel can be effectively reduced, and thus, a more comfortable drive can be realized.

The actuator may include a plurality of actuators. The control device may sequentially execute the controls of the actuators in an order according to a priority based on a given condition.

That is, when there are the plurality of actuators to be controlled, the priority is set, and the controls are executed in the order according to the priority. Since a load of a calculation can be reduced, the control can be simplified. As a result, the cost and size of the control device are reduced so that realization (i.e., manufacture) of the control device becomes easy.

In the drive control system, the actuator may include a first actuator configured to generate the driving force for the vehicle to travel, and a second actuator configured to adjust the driving force generated by the first actuator.

The control device may include a processor configured to execute a request output setting module to set an output value corresponding to the requested driving force, a target output setting module to set an output value used as a target of the control by adding the given delay time to the requested output value set by the request output setting module, a model predicting module to store a device model having a response characteristic corresponding to each of the first and second actuators, and perform an input-and-output operation corresponding to each of the first and second actuators by using the device model, and an actual actuator controlling module to control operation of each of the first and second actuators. The actual actuator controlling module may cause each of the first and second actuators to output a driving force corresponding to the target output value set by the target output setting module based on an input value obtained by carrying out an inverse operation by the model predicting module.

A priority of operation of each of the first and second actuators may be set based on a given condition, and the model predicting module sequentially executes the input-and-output operation in an order according to the priority.

The given condition may be set based on at least any one of a restriction of the actuator, a response of the actuator, an execution accuracy of the actuator, and an execution capability of the actuator.

That is, these conditions are preferable as the given condition. By determining the priority based on at least any one of these conditions, a suitable priority can be set.

Each of the requested output value and the target output value may have an output waveform inclined corresponding to a temporal change in the driving force, and a slope of the output waveform of the requested output value may substantially coincide with a slope of the output waveform of the target output value.

That is, the change in the outputted driving force of the target output value is substantially coincidence with that of the requested output value, and only a difference therebetween is a time lag by the delay time. Accordingly, since it is possible to travel according to the amount of operation of the accelerator pedal, the good driving feel can be obtained.

The delay time may be changed according to a change in one or both of a temperature condition and an atmospheric pressure condition, that changes the driving force.

Since the cognitive limit is a short period of time, setting the delay time based on the cognitive limit presents a large control load, and the drive control may become unstable. Therefore, in terms of the control, although a longer delay time is desirable, if the delay time is too long, the driver may feel discomfort. Moreover, also when the delay time changes in a short period of time, since the driver is easily able to recognize the drive difference, the driver may have feel discomfort.

Particularly, the driving force easily changes due to the temperature condition and the atmospheric pressure condition. Thus, by changing the delay time according to the changes in these conditions, the driving feel can be further improved.

BRIEF DESCRIPTION OF DRAWINGS

FIG. 1A is a conventional example, and FIG. 1B is one example of a drive control system according to the present disclosure.

DETAILED DESCRIPTION OF THE DISCLOSURE

Hereinafter, one embodiment of the disclosed technology is described in detail based on the accompanying drawings. Note that the following description is essentially an illustration, and therefore, it does not limit the present disclosure, its application, or its use.
<Outline of Disclosed Technology>

An automobile (vehicle) travels by a driver operating an accelerator pedal and a brake pedal, while operating a steering wheel. As the accelerator pedal is depressed, the automobile accelerates, and as the brake pedal is depressed, the automobile decelerates or slows down. Since the automobile accelerates or decelerates according to an amount of operation, if there is a shift or a response delay between the amount of operation and the acceleration or deceleration, it gives a sense of discomfort to the driver.

On the other hand, if the automobile accelerates or decelerates appropriately according to the operation by the driver, the driver feels refreshed because of a sense of unity with the automobile. Therefore, the improvement in the driving feel is an important subject of the drive control for automobiles, and therefore, various examinations have been performed.

For example, in the drive control of the automobile, normally, a controlled amount of a target acceleration of the control is set according to the amount of operation of the accelerator pedal. Then, at the operation timing of the accelerator pedal, a drive unit of an engine is controlled according to the controlled amount so that a corresponding driving force is outputted.

In addition, the technology of JP2010-167982A complements a delay of the engine output by using a drive motor to improve the driving feel. The outline of the drive control during acceleration is illustrated in FIG. 1A.

Figure 1A:
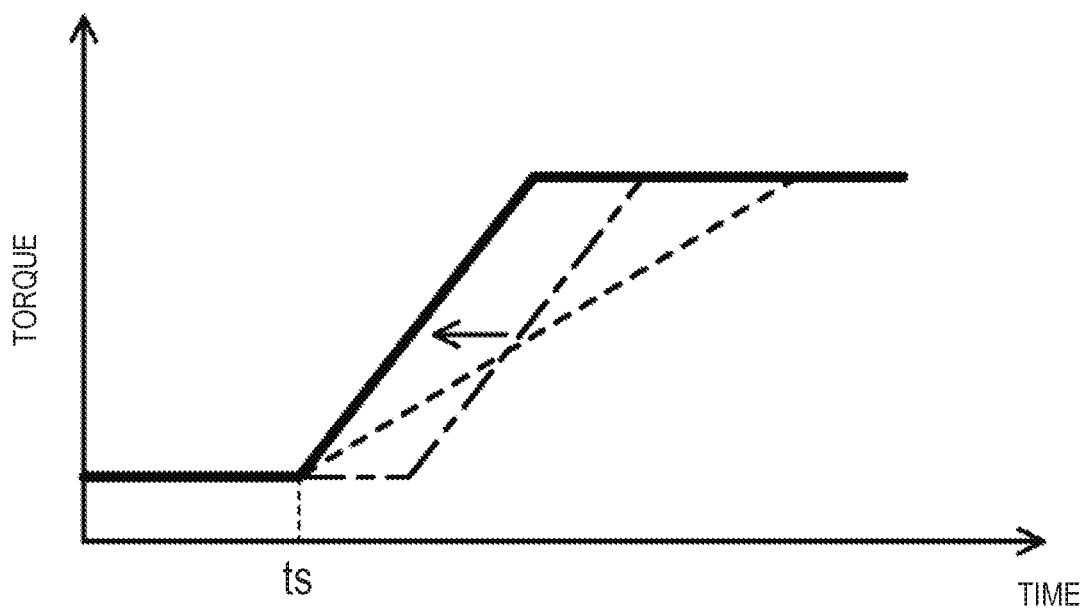
FIGS. 1A and 1B illustrate comparative examples of a drive control during acceleration, where

A solid line in FIG. 1A is an output waveform of torque (corresponding to a requested output value) indicative of a temporal change in a driving force of which output is required (total force). The requested output value is an output value which is used as a target of control (target output value), and it is controlled so that the output of torque begins at a time ts.

On the other hand, with only the output of the engine, a response delay occurs like a one-dot chain line. Thus, as illustrated by an arrow, the delayed part is complemented by the drive motor which excels in the response to realize the drive control which conforms to the target output waveform.

However, when the drive motor is used, the motor output drops due to a reduction in magnetism as the temperature inside the motor increases. Devices that output the driving force for propelling the automobile (may also be referred to as "actuators"), including the drive motor, may produce a difference in the output due to external causes, even if they are controlled using the same control parameters. In such a case, as illustrated by a broken line in FIG. 1A, a shift in time is generated in the output torque.

For the senses of a person, even if there is a shift in the response of the actuator to the operation and the amount of shift is somewhat large, it is difficult for the person to recognize it, when the shift is always constant or when the shift changes gradually over time. On the other hand, it is easy to notice a change over a short period of time, even if the amount of shift is small. Therefore, when a variation occurs in the output torque, the driver may feel discomfort.

Moreover, there is a time limit (i.e., a cognitive limit) in people's cognitive capability below which most people cannot perceive such a shift. Except for special people with highly developed perceptive abilities, such as a race car driver, average persons cannot recognize such a shift within a time of 150 ms or less, regardless of the magnitude (the person cannot perceive the existence of the shift). In some examples this time limit is referred to as a predetermined cognitive threshold time period and is set in a range between 100 milliseconds and 200 milliseconds, and in one particular example is set to 150 ms. In other examples, the predetermined cognitive threshold time period may be a value in a range between 10 ms and 150 ms or between 50 ms and 150 ms, for example.

Figure 1B:
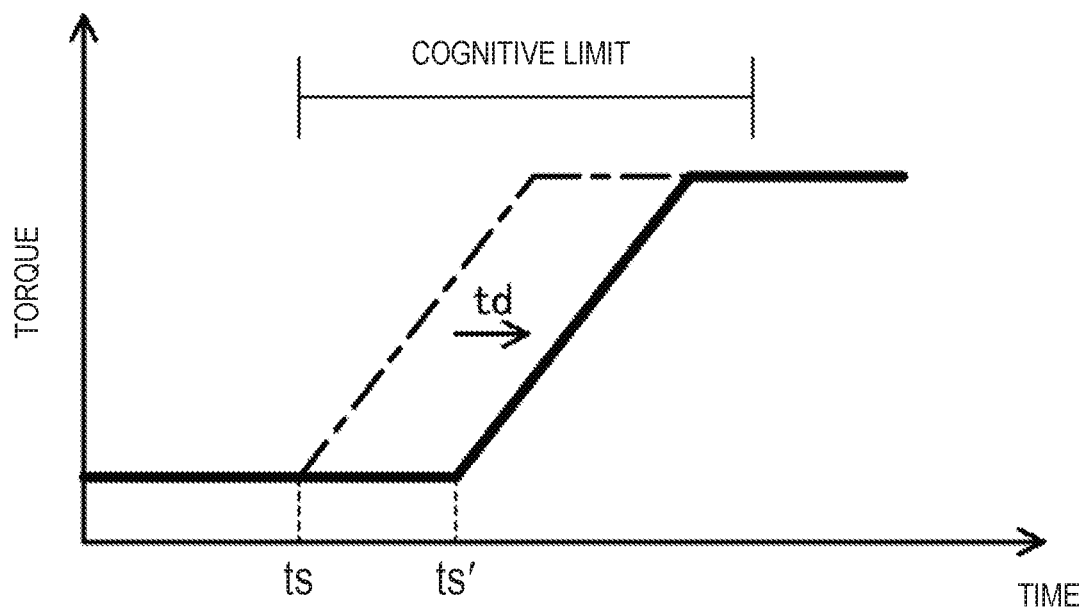

Thus, the drive control system of this embodiment is devised so that such a person's sense is used to improve the driving feel by applying the disclosed technology. An outline of the drive control during acceleration is illustrated in FIG. 1B. A one-dot chain line is a temporal change in the requested driving force, and it is set so that the output of torque begins at the time ts.

In the drive control system, the requested output value set corresponding to the requested driving force is not itself used as the target output value as it is, but a given delay time td is added to the requested output value. Thus, the target output value which is delayed from the operation timing of the accelerator pedal is set. That is, without carrying out the drive control at the operation timing of the accelerator pedal like the conventional technology, the drive control is carried out at the given intentionally delayed timing so that the output of torque begins at a time ts'.

A delay time td is desirably set within a range of the cognitive limit (i.e., 150 ms or less). Thus, the delay from the operation timing by the delay time td cannot be recognized by a normal driver. Therefore, cognitively, a short delay time in this range is the same as "no delay."

Moreover, even if the delay time td is outside the range of the cognitive limit, the driver is unlikely to feel discomfort from this delay, when the delay from the operation timing is always the same. Therefore, also in such a case, the good driving feel can be maintained unless the amount of shift becomes considerably large.

In the drive control system, the actuators, such as the engine and the drive motor, are controlled by a model based predictive control using the delay time td so that the target output value is always fixed. An outline of this drive control executed by the drive control system is described with reference to FIG. 2.

Figure 2:
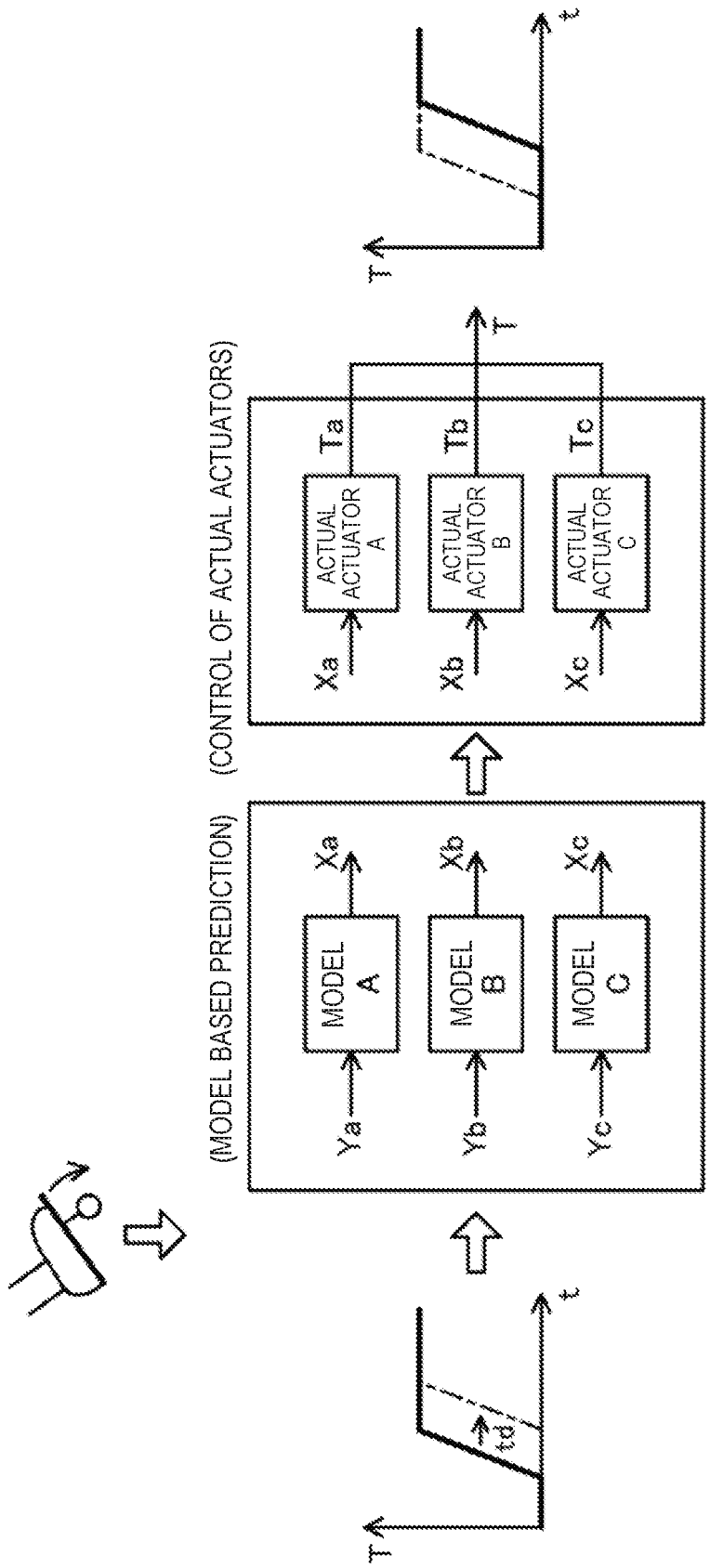
FIG. 2 is a conceptual diagram illustrating an outline of the drive control system.

FIG. 2 is a conceptual diagram illustrating the outline of the drive control during acceleration which is executed by the drive control system. Actual actuators A-C are installed in the automobile as the actuators. The drive control system controls these actual actuators A-C to output the driving forces requested by the driver, and therefore, the automobile is propelled.

In the drive control system, models A-C corresponding to the actual actuators A-C are implemented as software. These models A-C have the same response characteristics as the corresponding actual actuators A-C, and based on various operational information detected by various sensors installed in the automobile, they operate like the actual actuators A-C but in software.

That is, if an input value inputted into a model is the same as that of the actual actuator, the model executes a given calculation using the same operational information as that of the actual actuator, and outputs substantially the same output value as that of the actual actuator. By using the model, it is also possible to calculate the input value from the output value (inverse operation).

Therefore, in this drive control system, when the driver depresses the accelerator pedal, a driving force requested by this operation (requested driving force) is detected by an accelerator sensor. Based on the detection value of the accelerator sensor, an output value of torque corresponding to the requested driving force (requested output value) is set. In this drive control system, the given delay time td (e.g., 100 ms) is added to the requested output value. Thus, the output value used as a target of the control (target output value) is set.

As described above, individual output values Ya, Yb, and Yc of the torque of which the outputs of the target output values are predicted to be possible under a given condition are inputted into the respective models. Thus, the inverse operation of the individual output values (element output values Xa, Xb, and Xc) is carried out by the respective models. By inputting the element output values Xa, Xb, and Xc thus acquired into the corresponding actual actuators, the control of the actual actuators is performed.

As a result, the driving force of the target output value is outputted by synthesizing driving forces Ta, Tb, Tc outputted from the actual actuators. Since the actual actuators are controlled by the input values obtained by carrying out the inverse operations by using the model based predictive control, it is always possible to output the constant target output values.

Concrete Example of Application of Disclosed Technology

Figure 3:
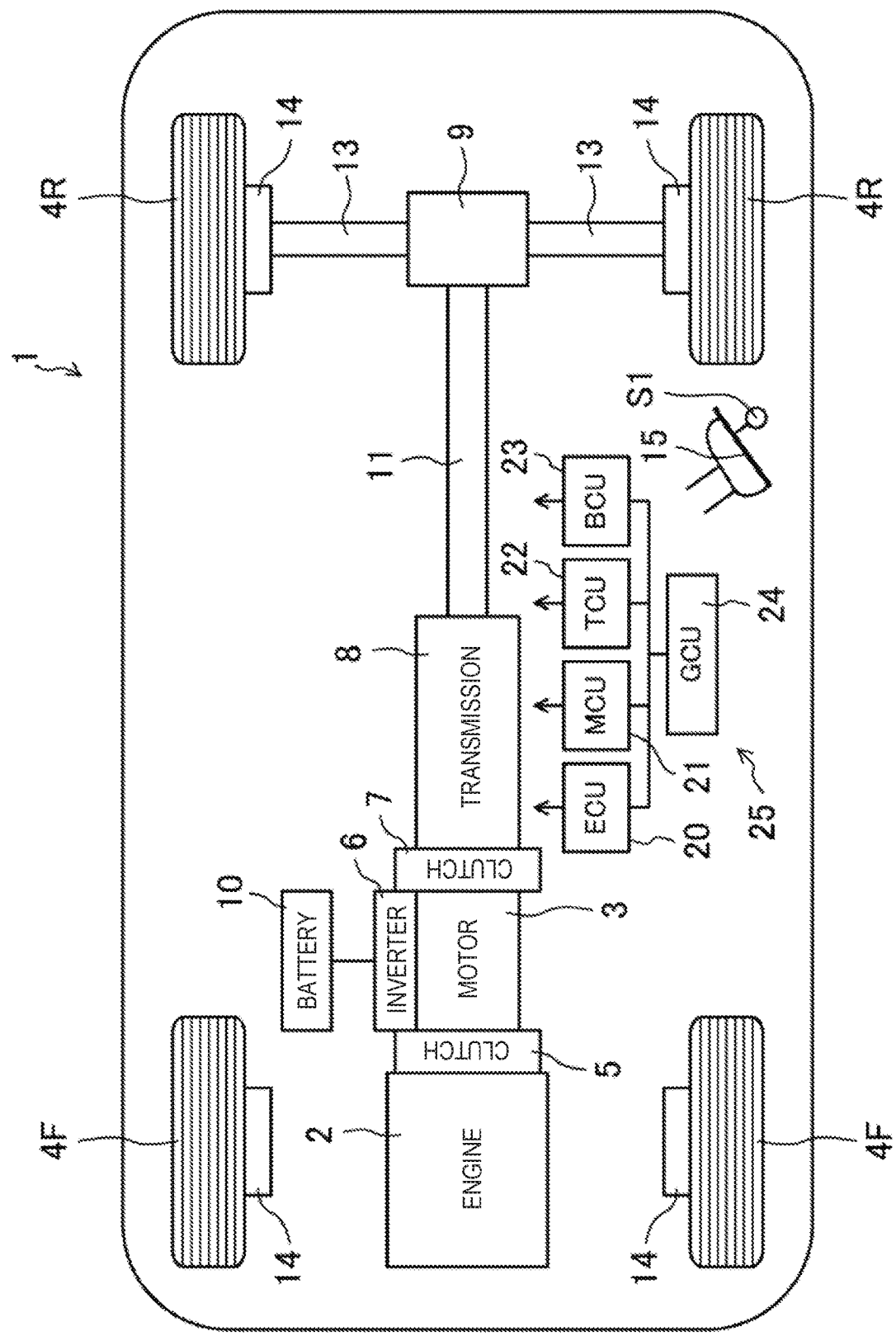
FIG. 3 is a view illustrating a general configuration of an automobile to which the drive control system has been applied.

A concrete example of an application of the disclosed technology is illustrated in FIG. 3. FIG. 3 illustrates a substantial configuration of a four-wheeled automobile 1 (vehicle) where the drive control system is mounted.

This automobile 1 is a hybrid car. An engine 2 and a drive motor 3 are mounted on the automobile 1 as drive sources. By the driver operating the automobile 1, these drive sources collaboratively drive two wheels (drive wheels 4R) located symmetry in the left-and-right direction among four wheels 4F, 4F, 4R, and 4R. Thus, the automobile 1 moves (travels). That is, each of the engine 2 and the drive motor 3 constitutes the actuator which generates a driving force for the automobile 1 to travel (First actuator).

In this automobile 1, the engine 2 is disposed at the front side of a vehicle body, and the driving wheels 4R are disposed at the rear side of the vehicle body. That is, this automobile 1 is a so-called front-engine, rear-wheel drive (FR) vehicle. Further, in this automobile 1, as the drive source, the engine 2 is mainly used rather than the drive motor 3, and the drive motor 3 is used for assisting the drive of the engine 2 (a so-called mild hybrid). The drive motor 3 is also used as a power generator during regeneration, in addition to the drive source.

The automobile 1 is provided with a first clutch 5, a second clutch 7, a transmission 8, a differential gear 9, and a brake 14, as actuators (Second actuators) which adjust the driving forces generated by the engine 2 and the drive motor 3. An inverter 6 and a battery 10 are attached to the drive motor 3.

The automobile 1 is also provided with an engine control unit (ECU) 20, a motor control unit (MCU) 21, a transmission control unit (TCU) 22, a brake control unit (BCU) 23, and a general control unit (GCU) 24, as control devices which control operations of the actuators.

(Actuators)

For example, the engine 2 is an internal combustion engine that performs combustion using gasoline as fuel. The engine 2 is a so-called four-cycle engine which generates a rotational motive force by repeating each cycle of an intake stroke, a compression stroke, an expansion stroke, and an exhaust stroke. Although there are various kinds and forms of the engine 2, such as a diesel engine, the kind and form of the engine 2 are not limited in particular in the disclosed technology.

In this automobile 1, the engine 2 is disposed in a substantially central part in the vehicle width direction so that an output shaft thereof which outputs the rotational motive force is oriented in the vehicle longitudinal direction. Although various devices and mechanisms attached to the engine 2, such as an intake system, an exhaust system, and a fuel supply system, are installed in the automobile 1, illustration and description thereof are omitted.

The drive motor 3 is connected in series with the engine 2, rearward of the engine 2 via the first clutch 5. The drive motor 3 is a permanent magnet type synchronous motor driven by three-phase AC power.

The first clutch 5 is installed between the drive motor 3 and the engine 2. The first clutch 5 switches between a state where the drive motor 3 and the engine 2 are connected (engaged state) and a state where the drive motor 3 and the engine 2 are disconnected (disengaged state).

The second clutch 7 is installed between the drive motor 3 and the transmission 8. The second clutch 7 switches a state where the drive motor 3 and the transmission 8 are connected (engaged state) and a state where the drive motor 3 and the transmission 8 are disconnected (disengaged state).

The drive motor 3 is connected with the onboard battery 10 via the inverter 6. In this automobile 1, as the battery 10, a DC battery of which the rated voltage is below 50V (in detail, 48V) is used.

Therefore, since the voltage is not so high, the battery itself can be lightweight and compact. In addition, since an advanced measure against an electric shock is unnecessary, insulated members, etc. can be simplified, and therefore, it can be further lightweight and compact. Therefore, since the weight of the automobile 1 can be reduced, fuel efficiency and power efficiency can be improved.

In powering, the battery 10 supplies DC power to the inverter 6. The inverter 6 converts the DC power into controlled three-phase AC power, and outputs it to the drive motor 3. Thus, the automobile 1 travels by the drive force of the drive motor 3. On the other hand, during regeneration, the drive motor 3 is used as the generator. Therefore, the battery 10 is charged as needed.

In this automobile 1, the transmission 8 is a multi-stage automatic transmission (so-called AT). The transmission 8 has an input shaft at one end and an output shaft at the other end. Between the input shaft and the output shaft, transmission mechanisms, such as a plurality of planet-gear mechanisms, a clutch, and a brake, are incorporated.

By switching between the transmission mechanisms, switching of forward or reverse, and changing in rotation speed differences between the input and the output of the transmission 8 are possible. The output shaft of the transmission 8 is coupled to the differential gear 9 via a propeller shaft 11 which extends in the vehicle longitudinal direction and disposed coaxially with the output shaft.

The differential gear 9 is connected to a pair of drive shafts 13 which extend in the vehicle width direction and are coupled to the left and right driving wheels 4R. A rotational motive force outputted through the propeller shaft 11 is distributed by the differential gear 9, and the distributed motive forces are transmitted to the driving wheels 4R through the pairs of drive shafts 13. A brake 14 is attached to each of the wheels 4F, 4F, 4R, and 4R in order to brake the rotation.

(Control Device 25)

In the automobile 1, the units of the ECU 20, the MCU 21, the TCU 22, the BCU 23, and the GCU 24, which are described above, are installed in order to control the traveling of the automobile 1 according to the driver's operation. Each of these units is comprised of hardware, such as a processor (e.g., a central processing unit (CPU)), memory, and an interface, and software, such as a database and a control program.

The ECU 20 is a unit which mainly controls the operation of the engine 2. The MCU 21 is a unit which mainly controls the operation of the drive motor 3. The TCU 22 is a unit which mainly controls the operation of the transmission 8. The BCU 23 is a unit which mainly controls the operation of the brake 14. The GCU 24 is electrically connected to the ECU 20, the MCU 21, the TCU 22, and the BCU 23, and is a host unit which comprehensively controls these units.

The configurations of the ECU 20, the MCU 21, the TCU 22, BCU 23, and the GCU 24 may be changed according to the system specification. For example, such hardware may be comprised of a sole unit, or the units may be partially combined or separated. For convenience, these units may also be comprehensively referred to as a "control device 25."

Figure 4:
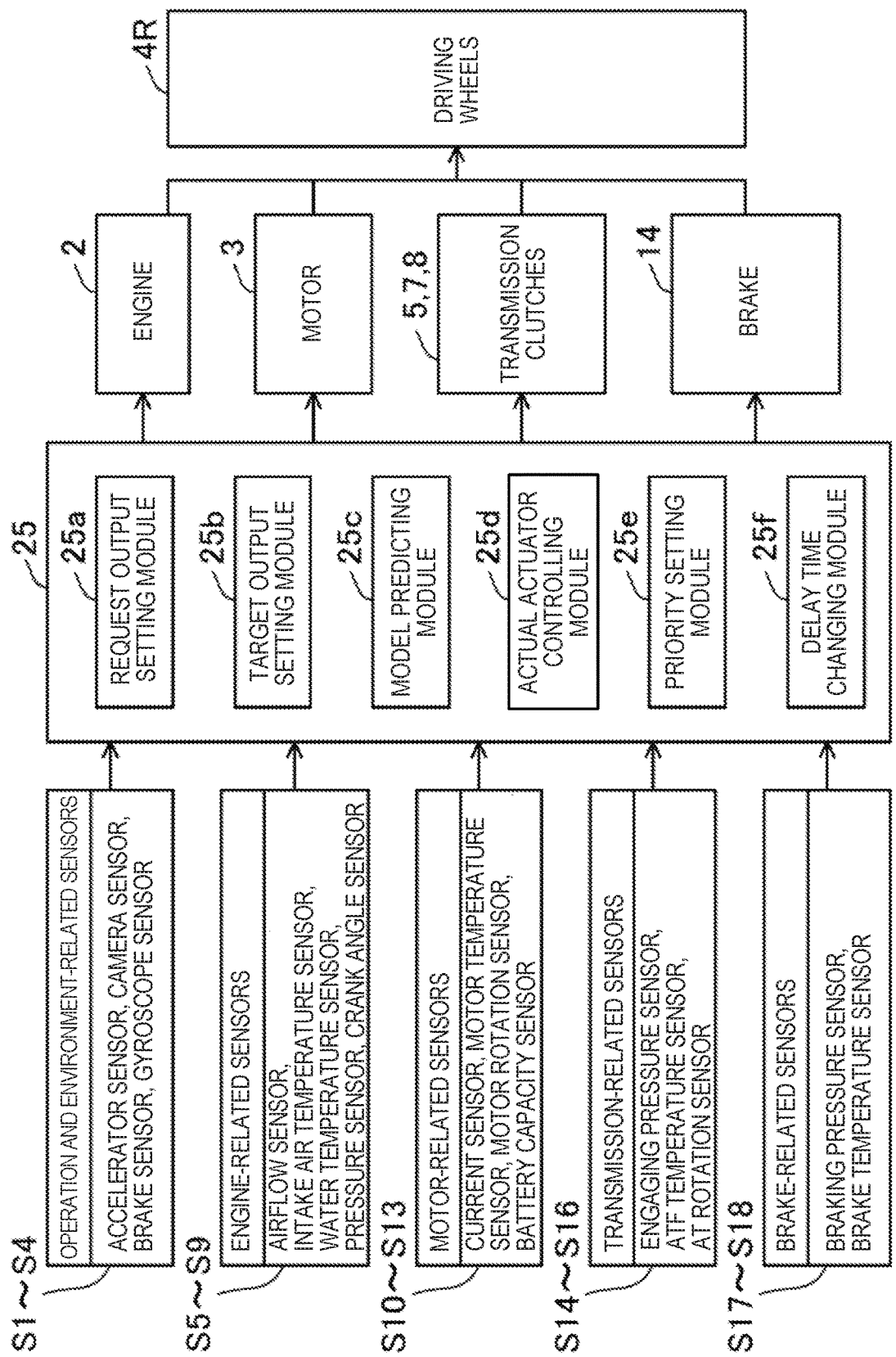
FIG. 4 is a block diagram illustrating a control device and exemplary peripheral devices.

FIG. 4 illustrates the control device 25 and substantial peripheral devices thereof. The control device 25 is provided with a request output setting module 25a, a target output setting module 25b, a model predicting module 25c, and an actual actuator controlling module 25d, as the functional configurations. The control device 25 may be further provided with a priority setting module 25e, a delay time changing module 25f, etc.

The request output setting module 25a sets, when the driving force is requested by the driver's operation, such as depressing an accelerator pedal 15, an output value corresponding to the requested driving force (requested output value). The target output setting module 25b sets an output value used as a target of the control (target output value) by adding the given delay time td to the requested output value.

The model predicting module 25c stores a device model having a response characteristic corresponding to each of the actuators, such as the engine 2 and the drive motor 3. For example, the device model is comprised of a given empirical equation. When the input value same as that of the actual actuator is introduced into the device model, it can acquire the output value same as that of the actual actuator based on the information inputted from each sensor similarly to the actual actuator.

The model predicting module 25c performs an input-and-output operation corresponding to each of the actuators by using the device model. In particular, in this drive control system, the model predicting module 25c performs an inverse operation to perform the model based predictive control.

The actual actuator controlling module 25d actually controls the operations of the actuators. In detail, the actual actuator controlling module 25d controls the operation of each actuator based on the input value acquired by the model predicting module 25c carrying out the inverse operation. Thus, the actuators collaboratively output the driving forces corresponding to the target output values. Note that the priority setting module 25e and the delay time changing module 25f are described later.

Various sensors are attached to the automobile 1. As illustrated in FIG. 4, these sensors are electrically connected to the control device 25 and detect various information, including operation information, traveling environment information, and operational information on each actuator, during operation of the automobile 1.

In detail, an accelerator sensor S1 (output sensor) is attached to the accelerator pedal 15 operated by the driver, and detects an accelerator opening corresponding to the amount of operation of the accelerator pedal 15. A brake sensor S2 (output sensor) is attached to a brake pedal (not illustrated) operated by the driver, and detects a brake opening corresponding to the amount of operation of the brake pedal. Each of the accelerator opening and the brake opening corresponds to an output required for driving the automobile 1.

A camera sensor S3 outputs an image around the automobile 1. A gyroscope sensor S4 outputs a posture, etc. of the automobile 1. An airflow sensor S5 detects an amount of fresh air introduced into the engine 2. An intake air temperature sensor S6 detects a temperature of fresh air. A pressure sensor S7 detects a combustion state of the engine 2. A water temperature sensor S8 detects a temperature of cooling water (coolant) of the engine 2. A crank angle sensor S9 detects a rotation angle of the engine 2.

A current sensor S10 detects a value of current supplied to the drive motor 3. A motor rotation sensor S11 detects a rotation speed and a rotational position of the drive motor 3. A motor temperature sensor S12 detects a temperature of the drive motor 3. A battery capacity sensor S13 detects an amount of charge of the battery.

An engaging pressure sensor S14 detects an engaging pressure of the transmission 8. An AT rotation sensor S15 detects a rotation speed outputted from the transmission 8. An ATF temperature sensor S16 detects an oil temperature of the transmission 8. A braking pressure sensor S17 detects a pressure of each brake 14. A brake temperature sensor S18 detects a temperature of each brake 14.

The information detected by these sensors S1-S18 are outputted to the control device 25 as needed. Based on the requested driving force detected by the accelerator sensor S1 or the brake sensor S2, and information required for the control, the control device 25 controls the operation of each actuator. Thus, the driving wheels 4R rotate and the automobile 1 travels.

For example, when the automobile 1 travels by the driving force of the engine 2, the control device 25 controls the operation of the engine 2 based on the detection values of the sensors S1-S18. Then, it controls the first clutch 5 and the second clutch 7 so that the first clutch 5 and the second clutch 7 become in an engaged state. Further, it controls each brake 14 during braking of the automobile 1.

During braking with regeneration, the control device 25 controls the first clutch 5 to be in the disengaged state or a partially engaged state, and controls the second clutch 7 to be in the engaged state. Then, it controls so that power is generated by the drive motor 3 and the generated power is collected by the battery 10.

The control device 25 is configured to determine a response characteristic of the actuator, and control operation of the actuator based on the requested driving force detected by the output sensor and further based on the response characteristic. The control device 25 controls the actuator by outputting a target output value based on the response characteristic. The target output value is set by adding a given delay time to a requested output value that is set according to the requested driving force.

First Example of Drive Control

Figure 5:
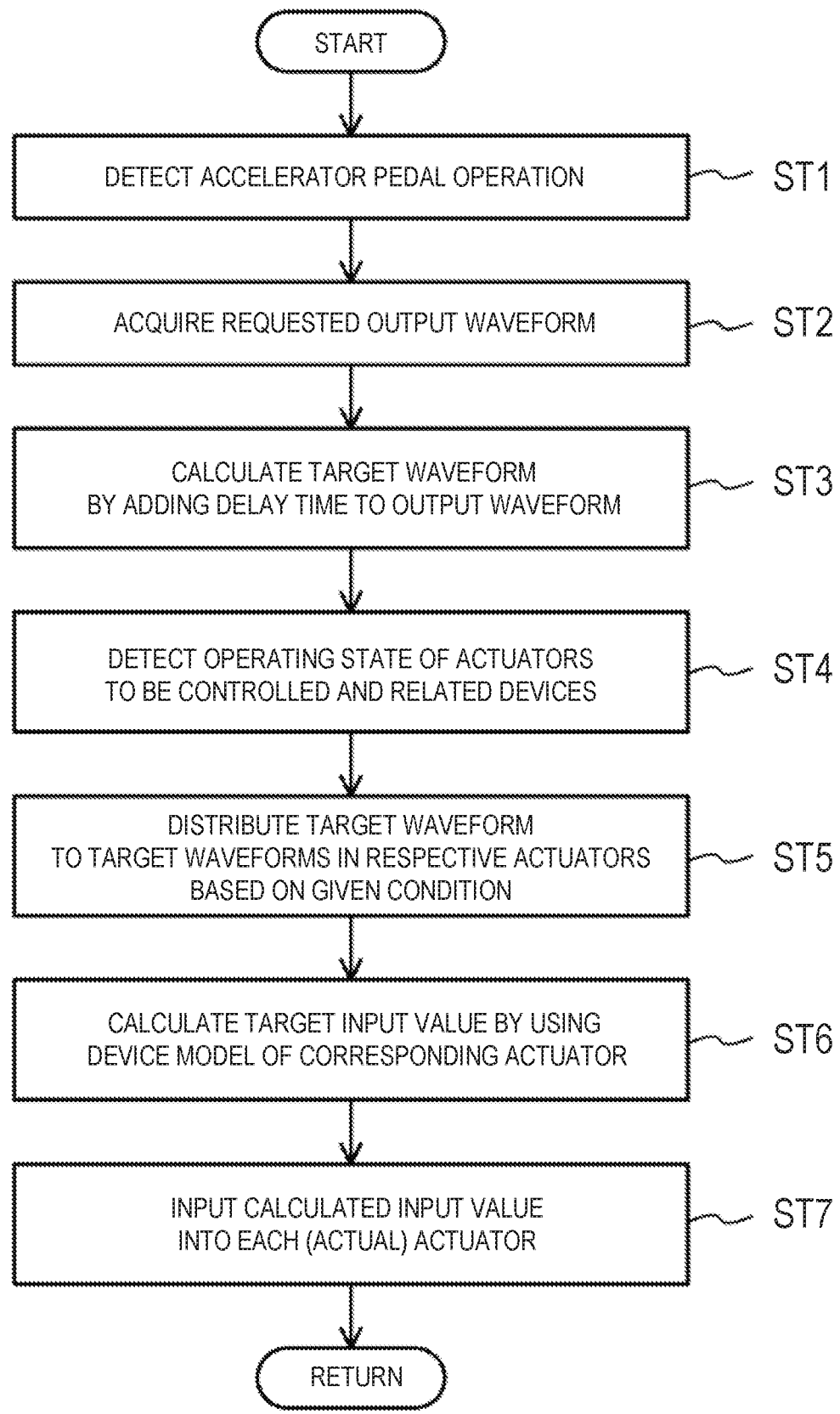
FIG. 5 is a flowchart (first example) of the drive control.

One example of the drive control during acceleration is illustrated in FIG. 5. Although the disclosed technology is applicable not only to acceleration but also to deceleration, only the acceleration is described herein for convenience.

Figure 6:
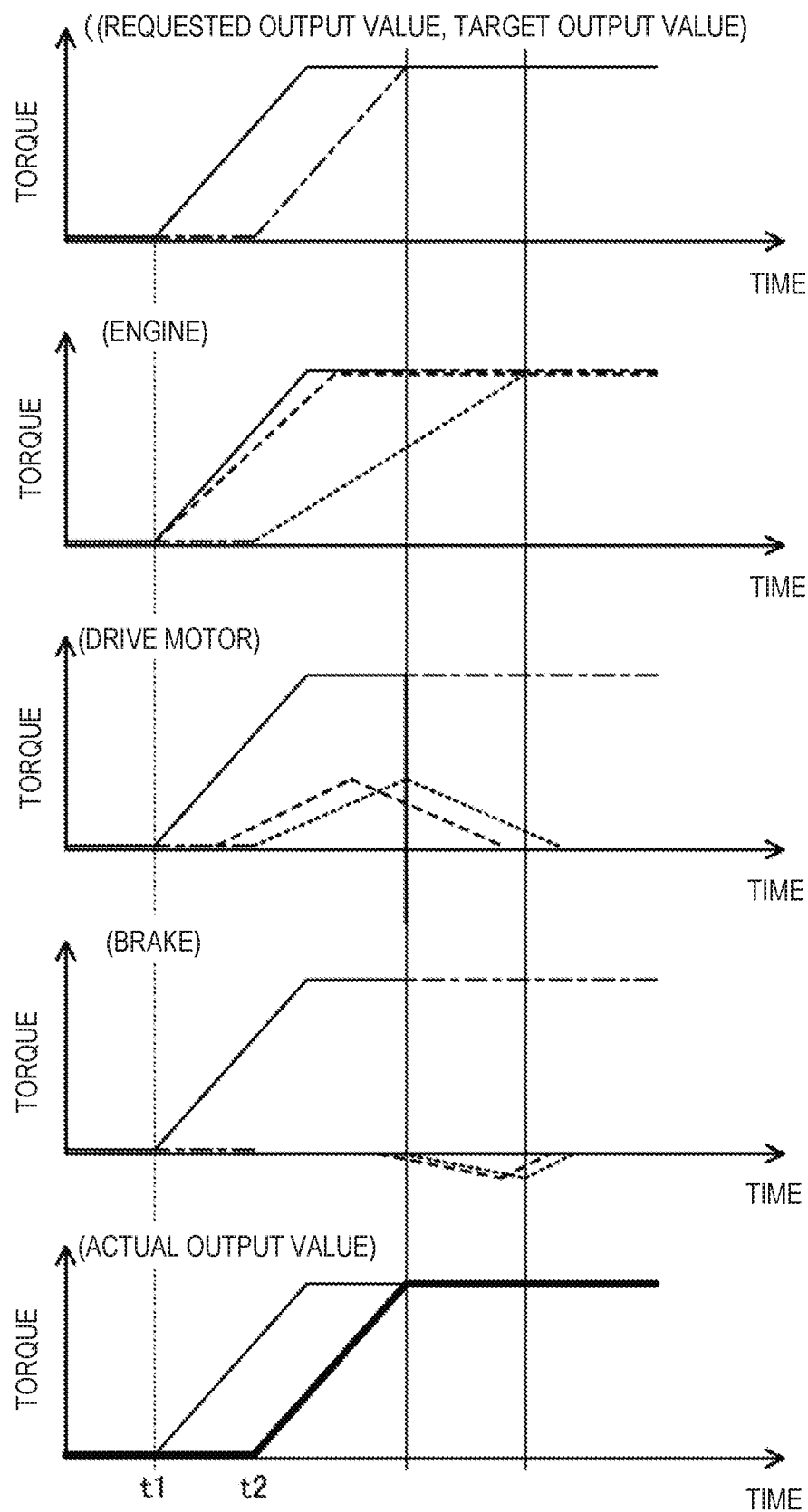
FIG. 6 is a view illustrating output waveforms of, for example, an actuator corresponding to the drive control of FIG. 5.

FIG. 6 illustrates output waveforms of, for example, the actuators corresponding to the drive control. In this example, the engine 2, the drive motor 3, and the brake 14 are illustrated as the actuators to be controlled.

In FIG. 6, a first graph about the requested output value and the target output value, a second graph about the engine 2, a third graph about the drive motor 3, a fourth graph about the brake 14, and a fifth graph about an actual output value are illustrated from the top in this order. The output waveforms indicative of temporal changes in torque (driving force or braking force) is illustrated in these graphs. The torques indicated by these output waveforms correspond to a driving force outputted to the driving wheels (total driving force), a driving force outputted from each actuator in order to constitute the total driving force (element driving force), etc.

A thin solid line in the first graph indicates the output waveform of the requested output value corresponding to the driver's accelerator pedal operation. A one-dot chain line in the first graph indicates the output waveform of the target output value to which the delay time td (a time lag between t2 and t1) is added. Note that in this example, the delay time td is set as a given value (e.g., 100 milliseconds).

A long broken line in the second graph indicates the input waveform of the input value inputted into the engine 2. A short broken line (dotted line) in the second graph indicates the output waveform of the driving force of the engine 2 which is a predicted output corresponding to the input waveform. A long broken line in the third graph indicates the input waveform of the input value inputted into the drive motor 3. A short broken line in the third graph indicates the output waveform of the driving force of the drive motor 3 which is a predicted output corresponding to the input waveform.

A long broken line in the fourth graph indicates the input waveform of the input value inputted into the brake 14. A short broken line in the fourth graph indicates the output waveform of the braking force of the brake 14 which is a predicted output corresponding to the input waveform. A thick solid line in the fifth graph is the output waveform in which the driving forces and the braking force which are predicted outputs of the engine 2, the drive motor 3, and the brake 14 are synthesized. This also corresponds to the total driving force which is actually outputted.

The detection values are always inputted into the control device 25 from the sensors S1-S18 during operation of the automobile 1. As illustrated in FIG. 5, when the driver depresses the accelerator pedal 15 to accelerate the automobile 1, the accelerator opening accompanying the accelerator pedal operation is detected by the accelerator sensor S1, and is outputted to the control device 25 (Step ST1).

Based on each detection value from the acceleration sensor S1, the control device 25 (request output setting module 25a) sets the requested output value corresponding to the requested driving force, and the control device 25 in this manner acquires the output waveform as illustrated in the first graph (Step ST2). The control device 25 (target output setting module 25b) adds the delay time td to the output waveform to set the target output value, and it calculates the output waveform as illustrated in the first graph (Step ST3).

The output waveform is calculated so that the slope of the requested output value is substantially coincidence with the slope of the target output value. That is, the driving force is similarly controlled for the requested output value and the target output value, and only a difference therebetween is a time delay in the control start timing.

The control device 25 detects the operating state of the engine 2, the drive motor 3, the brake 14, and related devices based on the information inputted from the sensors S1-S18 (Step ST4). For example, the engine speed of the engine 2 is calculated, based on the input value from the crank angle sensor S9, and the rotation speed of the drive motor 3 is calculated based on the input value from the motor rotation sensor S11.

The control device 25 distributes the output waveform of the target output value to the output waveforms of the output values which are to be used as the targets of the control in the actuators (element target output value) based on a given condition (Step ST5). For example, the output waveforms illustrated by the short broken lines in the second graph, the third graph, and the fourth graph of FIG. 6 correspond to the output waveforms.

The control device 25 (model predicting module 25c) carries out the inverse operation from each element target output value by using the device model of the corresponding actuator. Thus, the control device 25 acquires the input value which is to be used as the target in the actual actuator (Step ST6). For example, the waveforms illustrated by the long broken lines in the second graph, the third graph, and the fourth graph of FIG. 6 correspond to the input waveforms of the input values.

The control device 25 (actual actuator controlling module 25d) then inputs the acquired input value into each actuator which is the actual actuator (Step ST7). As a result, the driving forces and the braking forces which are outputted from the actuators are synthesized, and the synthesized force is outputted as the total driving force conforming to the target output value as illustrated in the fifth graph of FIG. 6.

Since the output waveform of the requested output value substantially coincides with the output waveform of the target output value, and the total driving force according to the amount of operation of the accelerator pedal is outputted, an appropriate driving feel is obtained. Since the delay time td is within a range of the cognitive limit of the driver, it cannot be recognized by the driver. Therefore, the delay time td will not give a sense of discomfort to the driver.

Since the actuator is controlled by the model based predictive control using the delay time td so that the target output value is always fixed, the variation in the driving feel can be reduced. Therefore, the sense of unity with the automobile 1 can be given to the driver, and the driver can drive comfortably.

Note that the braking force by the brake 14 is not essential to the drive control during acceleration. Since the driver only operates the accelerator pedal, the control of the brake 14 is performed independently from the driver's operation. For example, in the drive control of the drive motor 3, an overshoot or an undershoot may occurs. The control of the brake 14 is effective in reducing such an overshoot, etc. and complements the drive control of the drive motor 3.

(Second Example of Drive Control)

In the first example, each actuator is controlled individually based on the given condition. On the other hand, in the second example, the actuators are sequentially controlled one by one according to the priority.

In detail, as illustrated in FIG. 4, the priority setting module 25e which performs such a control is provided to the control device 25. The priority of operating the actuators is set in the priority setting module 25e based on a given condition. For example, the given condition includes a restriction, a response, an execution accuracy, and an execution capability of each actuator.

One example of the restriction of the actuator is a decrease in the capacity of the battery 10 (amount of charge). The decreased capacity of the battery 10 may restrict the power supply to the drive motor 3 from the battery 10 to below a given value.

Since the drive is restricted also when the drive motor 3, the transmission 8, or the brake 14 excessively increases in the temperature, this can become the restriction of the actuator. The priority based on the restriction of the actuator is normally set so that the priority becomes higher as the restriction becomes larger. Thus, even when the outputs are insufficient in some of the actuators due to the restrictions, the outputs can be complemented by other actuators.

The priority based on the response of the actuator is set so that the priority becomes higher as the response to the control becomes better. For example, the drive motor 3 is generally better in the response than the engine 2, and since the responses of the brake 14 and the transmission 8 are determined according to their structures, the responses can be compared. By using the actuators with the better responses preferentially, the drive control which is more accurate in time can be realized.

The priority based on the execution accuracy of the actuator is set so that the priority becomes higher as the execution accuracy becomes higher. The execution accuracy corresponds to a degree of the variation in the output value from the input value. The execution accuracy is higher as the variation of the output value is smaller. By using the actuators with the higher execution accuracies preferentially, the more stable drive control can be realized.

The priority based on the execution capability of the actuator is set so that the priority becomes higher as the execution capability becomes lower. The execution capability as used herein is a capability to perform the output of the target output value (in detail, its maximum driving force). When the target output value is outputted independently, the execution capability is lower for the actuator with a lower capability. By using the actuators with lower execution capabilities preferentially, since their outputs can be complemented with the actuators with higher execution capabilities, the more stable drive control can be realized.

Figure 7:
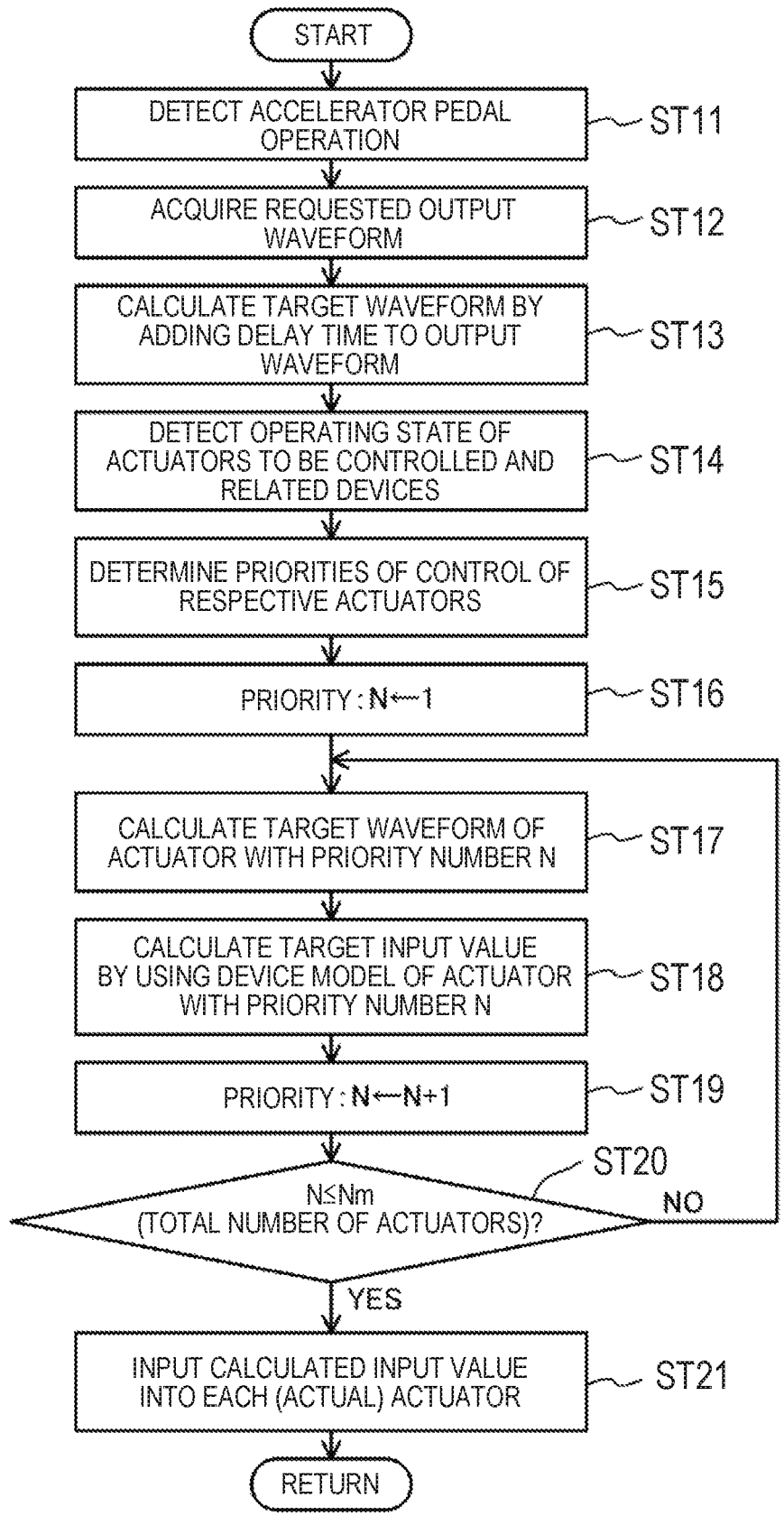
FIG. 7 is a flowchart (second example) of the drive control.
Figure 8:
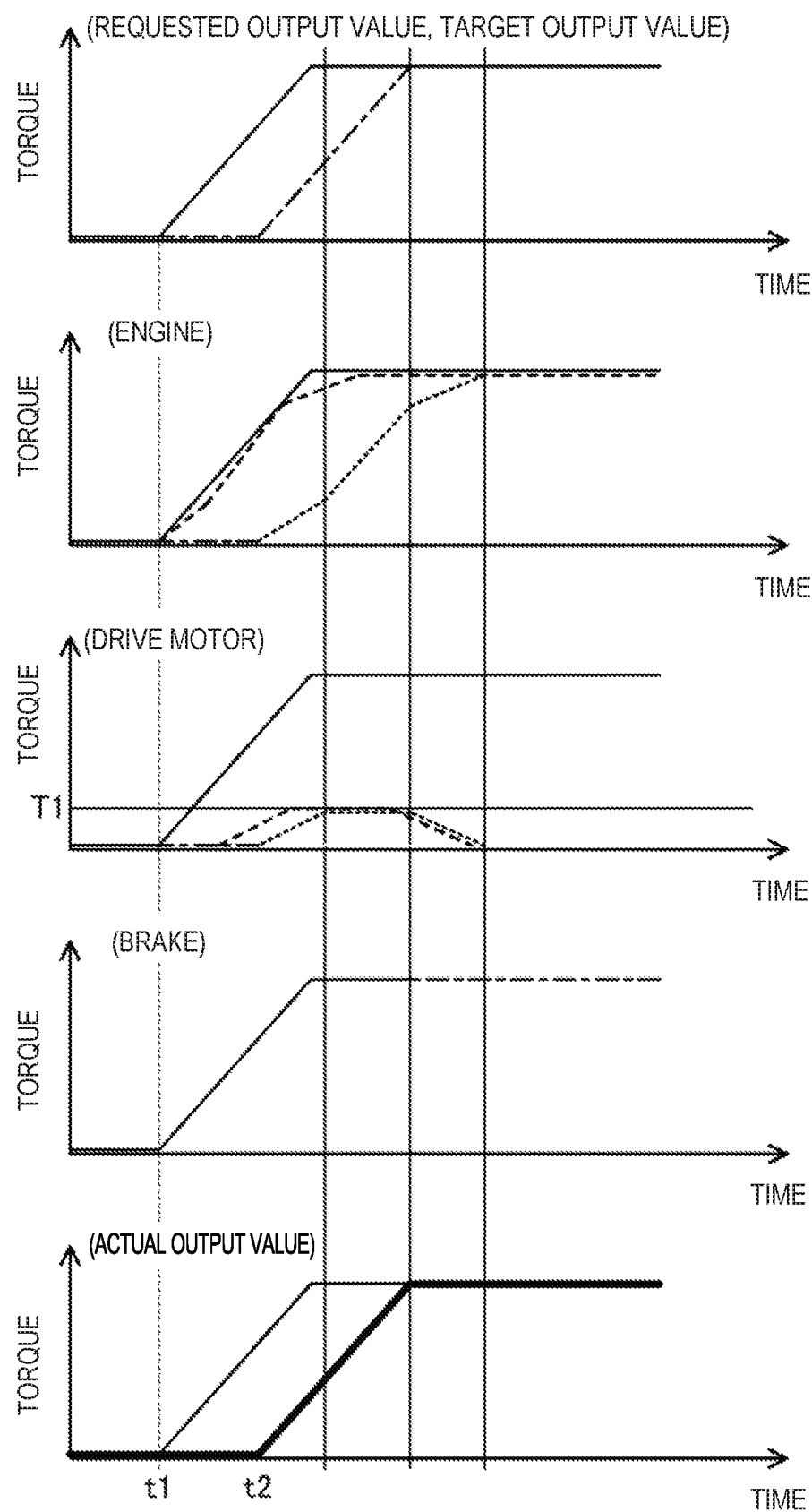
FIG. 8 is a view illustrating output waveforms of, for example, the actuator corresponding to the drive control of FIG. 7.

FIG. 7 illustrates one example of the drive control of the second example. FIG. 8 illustrates the output waveforms of, for example, the actuators corresponding to the drive control. For convenience, the drive control of the second example illustrates the same acceleration as the first example. Since FIG. 8 is similarly illustrated as FIG. 6, the same reference characters are used for the same contents to omit the description.

In the second example, the drive control in which each actuator is controlled according to the priority based on the restriction of the actuator (the capacity fall of the battery 10) is illustrated. Steps S11 to S14 are the same contents as those of the first example.

That is, as illustrated in FIG. 7, when the driver depresses the accelerator pedal 15, the accelerator opening is outputted to the control device 25 (Step ST11). The control device 25 (request output setting module 25a) sets the requested output value and acquires the output waveform as illustrated in the first graph of FIG. 8, and the control device 25 (target output setting module 25b) adds the delay time td to the output waveform to set the target output value and calculate the output waveform (Steps S12 and S13).

The control device 25 detects the operating state of the engine 2, the drive motor 3, the brake 14, and related devices based on the information inputted from the sensors S1-S18 (Step ST14). In this drive control, the control device 25 detects that the power outputted to the drive motor 3 is restricted to below the given value by the capacity fall of the battery 10 based on the information inputted from the battery capacity sensor S13. By the restriction, the output torque of the drive motor 3 is restricted to below a given value (T1), as illustrated in the third graph of FIG. 8.

The control device 25 (priority setting module 25*e*) determines the priorities of the actuators based on the detected operating states of the actuators (Step ST15). Thus, the control device 25 (priority setting module 25*e*) sets the priority of the drive motor 3 higher than the engine 2. The priority in the second example is determined as an order of the drive motor 3, the engine 2, and the brake 14. Then, numbers are given in this order to the actuators. A counter of the priority N is set to "1" as an initial value (Step ST16).

The control device 25 (model predicting module 25*c*) carries out a calculation to determine a target waveform of the actuator with the number set in the priority counter (Step ST17). It will be appreciated that the process flow loops through Step ST17 according to the priority order, based on the incrementing of the priority order, and determines the target output value for each actuator. The target waveform calculation at Step ST17 for each actuator among the plurality of actuators is performed similarly to Steps ST13 and ST3 by adding a delay time to the output waveform for the particular actuator.

The control device 25 (model predicting module 25*c*) carries out the inverse operation from each element target output value by using the device model of the actuator with the number set in the priority counter. Thus, the control device 25 acquires the target input value of the actual actuator (Step ST18).

In the second example, first, by using the device model of the drive motor 3, the input waveform of the input value illustrated by a long broken line is acquired from the output waveform of the element target output value illustrated by a short broken line, as illustrated in the third graph of FIG. 8. Each time the model based predictive control of the actuator is finished, "1" is added to the priority counter (Step ST19). Then, the model based predictive control of each actuator is performed in the order of the priority until the counter value of the priority reaches the total number N of the actuators to be controlled (Step ST20).

That is, the input waveform of the input value illustrated by a long broken line is acquired from the output waveform of the element target output value illustrated by a short broken line in the second graph of FIG. 8 by using the device model of the engine 2 of which the priority is the second highest. In the second example, since the output of the drive motor 3 is restricted, an overshoot does not occur. Thus, the output of the brake 14 becomes unnecessary. Therefore, even if the model based predictive control of the brake 14 itself is omitted or the model based predictive control of the brake 14 is executed, the input value becomes zero.

The control device 25 (actual actuator controlling module 25*d*) inputs the acquired input values into the respective actuators which are the actual actuators (Step ST21). As a result, the driving forces and the braking forces which are outputted from the actuators are synthesized, and as illustrated in the fifth graph of FIG. 8, the total driving force conforming to the target output value is outputted.

Third Example of Drive Control

In the first and second examples described above, a constant value set within a range of the cognitive limit is used as the delay time td.

When the delay time td is set within the range of the cognitive limit, there is no influence to the driving feel. However, since the cognitive limit is a short period of time, setting the delay time td within the range of the cognitive limit is large in the control load, and the drive control may become unstable.

Therefore, in terms of the control, although a longer delay time td is desirable, if the delay time td is too long, the driver may recognize the delay of drive and may sense the discomfort. Moreover, also when the delay time td changes in a short period of time, since the driver is easy to recognize the drive difference, the driver may feel discomfort. For example, when a large altitude difference of the traveling road occurs in a comparatively short period of time (e.g., in crossing a mountain pass), a difference may occur in the output of the engine 2 due to the atmospheric pressure difference, even if the input value stays the same.

Therefore, in the third example, the delay time td is changed according to an external cause.

In detail, as illustrated in FIG. 4, the control device 25 is provided with the delay time changing module 25*f* which performs such a control. The external cause with which the delay time td is desirably changed corresponds to a condition under which the driving force is changed, and it particularly includes an atmospheric pressure condition and a temperature condition.

In detail, since an amount of intake air introduced into a combustion chamber changes when the atmospheric pressure changes even if the drive control stays the same, the output may change. Moreover, also when the outside temperature changes, since the introducing amount of intake air changes and the combustion state changes, the output may change. Further, also when the temperature of the engine 2 or the drive motor 3 changes, since the combustion state changes, the output may change.

The response characteristic of each actuator may include a temperature-responsiveness relationship. A temperature-responsiveness table is shown below in Table 1, which indicates a response characteristic of each of a plurality of types of actuators under each of three listed temperature conditions.

TABLE 1

Temperature-Based Response Characteristics of Actuators

| Actuator type | Temperature | | |
|---|---|---|---|
| | Overheated | Normal | Low |
| Engine | — | Normal | Slightly Slow (due to poor combustion quality) |
| Drive Motor | Operation restricted | Normal | Rapid |
| Clutch | — | Rapid | Slow |
| Transmission | Operation restricted | Rapid | Slow |
| Differential | — | Normal | Slow (due to high resistance) |
| Brake | Operation restricted | Rapid | Slow |

In the above chart, three temperature ranges are illustrated, an overheated range, a normal range, and a low range. Each of these ranges is different for each actuator, and each range is separated from the other ranges by at least one predetermined threshold temperature. In the normal and low ranges, the actuators are all configured to operate, whereas in the overheated range, the actuators are not configured to operate, or are configured to operate in a restricted mode. A range of response characteristics are illustrated, including operation restricted, normal, rapid, and slow response. Of particular relevance are the response characteristics labeled slow or slightly slow, since it will be appreciated that these response characteristics may cause the given delay time computed by the control device to exceed a predetermined cognitive limit time period, such as 100-200 milliseconds, or more specifically 150 milliseconds. Accordingly, when the actuator type controlled under a current temperature condition has a response characteristic, such as slow, that would cause the drive force to be delivered after the predetermined cognitive time limit if the given delay time was applied, the control device is configured to change the given delay time, by an amount sufficient to cause the time until the drive force is applied by the actuator under the current temperature condition to be equal to or lower than the predetermined cognitive limit time period.

Thus, in this example, the response characteristic includes a temperature-response relationship between a temperature condition of the actuator and a response time of the actuator to output the driving force, and the control device 25 is configured to change the given delay time based on a detected temperature condition of the actuator, according to the temperature-response relationship. As Table 1 illustrates, the actuator for which the temperature-response relationship exists is selected from the group consisting of an engine, drive motor, clutch, transmission, differential, and brake. The control device 25 is configured to change the given delay time by acquiring current temperature information relating to the actuator, calculating an estimated amount of change in the output of the actuator based on the current temperature information based upon the temperature-response relationship, and upon determining that the estimated amount of change in the output of the actuator is above a predetermined cognitive threshold time period, changing the given delay time to be less than or equal to the predetermined cognitive threshold time period.

The response characteristic of each actuator may alternatively or additionally include a pressure-responsiveness relationship. A pressure-response relationship table is shown below in Table 2, which indicates a relationship between a response characteristic an engine actuator, and atmospheric pressure.

TABLE 2

Atmospheric Pressure-Based Response Characteristics of Actuators

| Actuator type | Atmospheric Pressure | |
| --- | --- | --- |
| | High | Low |
| Engine | Rapid | Slow |

Thus, in some configurations, the response characteristic includes a pressure-response relationship as illustrated in Table 2 above between an atmospheric pressure condition of the actuator and a response time of the actuator to output the driving force, and the control device 25 is configured to change the given delay time based on a detected atmospheric pressure condition of the actuator, according to the pressure-response relationship. The actuator for which the pressure-response relationship is provided is the engine in the example of Table 2. In this example, the control device 25 is configured to change the given delay time by acquiring current atmospheric pressure information relating to the actuator, calculating an estimated amount of change in the output of the actuator based on the current atmospheric pressure information based upon the pressure-response relationship, and upon determining that the estimated amount of change in the output of the actuator is above a predetermined cognitive threshold time period, changing the given delay time to be less than or equal to the predetermined cognitive threshold time period. As in the example of Table 1, in the example of Table 2, the predetermined cognitive threshold time period is between 100 milliseconds and 200 milliseconds, and may be set to 150 milliseconds.

Figure 9:
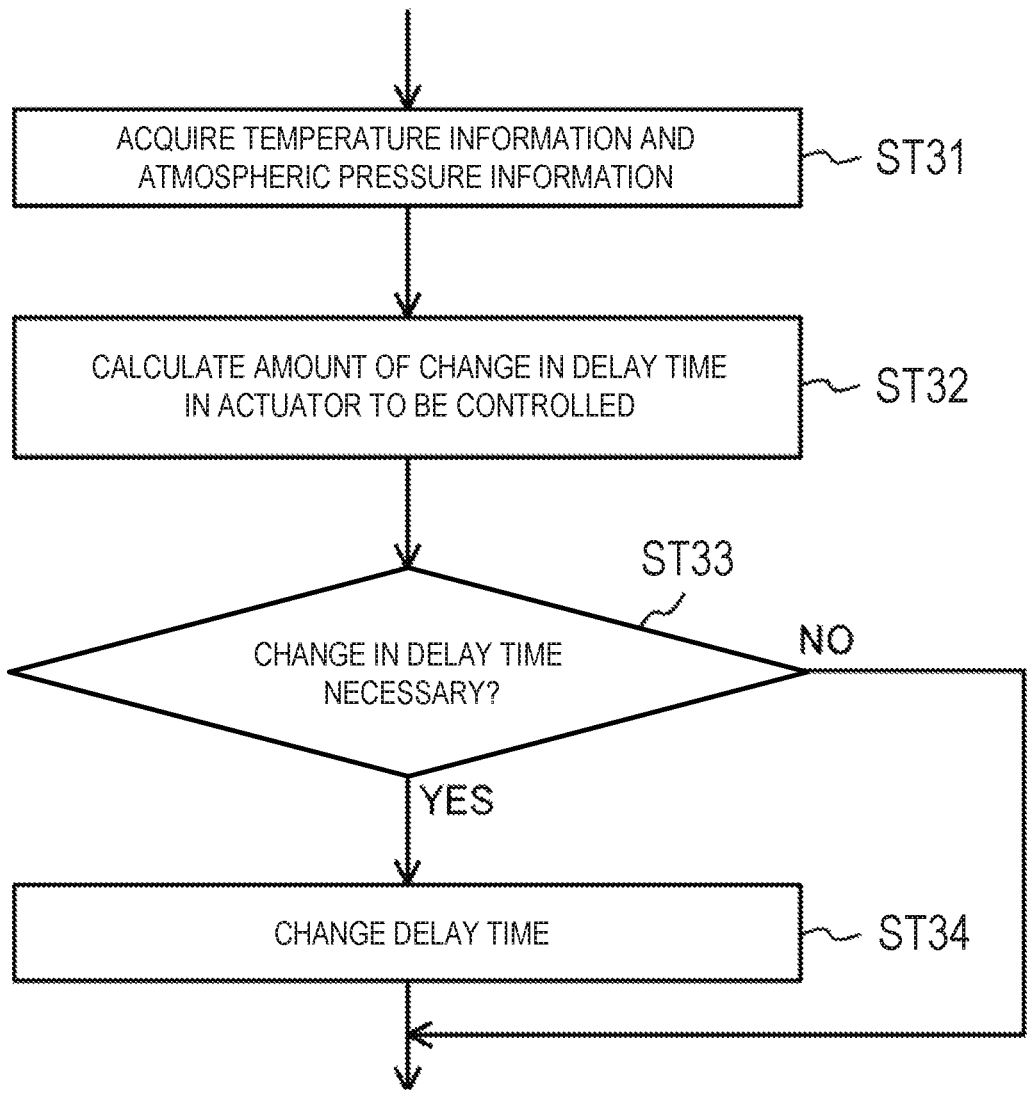
FIG. 9 is a partial flowchart (third example) of a delay time changing control.

FIG. 9 illustrates a control (delay time changing control) executed by the control device 25 (specifically, by the delay time changing module 25f of control device 25). The delay time changing control is applicable to the first example or the second example.

That is, if applying the delay time changing control to the first example, a flowchart illustrated in FIG. 9 may be inserted between Steps ST2 and ST3 of the flowchart illustrated in FIG. 5. If applying the delay time changing control to the second example, the flowchart illustrated in FIG. 9 may be inserted between Steps ST12 and ST13 of the flowchart illustrated in FIG. 7.

As illustrated in FIG. 9, in the delay time changing control, the control device 25 (specifically, the delay time changing module 25f of control device 25) acquires temperature information and atmospheric pressure information after Step ST2 or ST12 (Step ST31). For example, the temperature information on the engine 2 or the drive motor 3 is acquired using detection values of the intake air temperature sensor S6, the water temperature sensor S8, and the motor temperature sensor S12. Moreover, the altitude difference is calculated using the detection values of the accelerator sensor S1 and the gyroscope sensor S4 to acquire the atmospheric pressure information.

Then, the control device 25 calculates an amount of change in the output of the engine 2 and/or the drive motor 3 (corresponding to an amount of change in the delay time td) based on the temperature information and the atmospheric pressure information (Step ST32). From the result, the control device 25 determines whether a change in the delay time td is necessary (Step ST33). For example, if the driver may recognize the delay and sense the discomfort by the amount of change in the delay time td being too large, it determines that the change in the delay time td is necessary. The determination condition is set in the control device 25.

As a result, if the control device 25 determines that the change in the delay time td is necessary, it changes the delay time td (Step ST34). On the other hand, if it determines that the change in the delay time td is not necessary, the delay time td is not changed. Then, the control device 25 calculates the target output value (Step ST3 or ST13).

According to another example implementation of the present disclosure, a drive control method for use with an actuator configured to output a driving force for a vehicle to travel is provided. The method comprises determining a response characteristic of the actuator, detecting a driving force requested by an operation of a driver of the vehicle, via an output sensor, determining a requested output value at a current timing corresponding to the requested driving force, and controlling operation of the actuator based on the requested driving force detected by the output sensor and the determined response characteristic. The control device controls the actuator by outputting a target output value based on the determined response characteristic of the actuator, and the target output value is set by adding a given delay time to a requested output value that is set according to the requested driving force.

In the drive control method of this implementation, the actuator is one of a plurality of actuators, the control device sequentially executes control of each of the plurality of actuators in an order according to a priority based on a given condition, and the given condition is selected from the following: a restriction of one the plurality of actuators, a response of one the plurality of actuators, an execution accuracy of one the plurality of actuators, and an execution capability of one the plurality of actuators.

Further, in the drive control method of this implementation, the actuator is a first actuator configured to generate the driving force for the vehicle to travel, and a second actuator is provided to adjust the driving force generated by the first actuator. The method further comprises setting an output value corresponding to the requested driving force, setting an output value used as a target of the control by adding the given delay time to a timing of the requested output value set by the request output setting module, storing a device model having a response characteristic corresponding to each of the first and second actuators, performing an input-and-output operation corresponding to each of the first and second actuators by using the device model, and controlling operation of each of the first and second actuators, such that each of the first and second actuators outputs a driving force corresponding to the target output value based on an input value obtained by carrying out an inverse operation of the input-and-output operation.

In this implementation of the method, the response characteristic includes a temperature-response relationship between a temperature condition of the actuator and a response time of the actuator to output the driving force and/or a pressure-response relationship between an atmospheric pressure condition of the actuator and a response time of the actuator to output the driving force, and the method further comprises changing the given delay time based on a detected temperature condition and/or a detected pressure condition of the actuator, according to the temperature-response relationship and/or the temperature-response relationship.

Further, in this implementation of the method changing the given delay time is accomplished at least in part by acquiring current temperature information and/or current pressure information relating to the actuator, calculating an estimated amount of change in the output of the actuator based on the current temperature information and/or current pressure information based upon the temperature-response relationship and/or the pressure-response relationship, and, upon determining that the estimated amount of change in the output of the actuator is above a predetermined cognitive threshold time period, changing the given delay time to be less than or equal to the predetermined cognitive threshold time period.

Thus, by executing the delay time changing control in the manners described above, the driving feel can be further improved.

Note that the control system for the vehicle according to the disclosed technology is not limited to the embodiment described above, but also encompasses other various configurations.

For example, in the embodiment described above, although the hybrid automobile is described as the example, it is not limited to the configuration. It is also applicable to automobiles driven only by an engine, and electric vehicles driven only by a drive motor. The kind and number of actuators to be controlled may be set according to the configuration of the vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (Vehicle)
2 Engine (Actuator)
3 Drive Motor (Actuator)
5 First Clutch (Actuator)
7 Second Clutch (Actuator)
8 Transmission (Actuator)
9 Differential Gear (Actuator)
14 Brake (Actuator)
25 Control Device
25a Request Output Setting Module
25b Target Output Setting Module
25c Model Predicting Module
25d Actual Actuator Controlling Module
25e Priority Setting Module
25f Delay Time Changing Module
td Delay Time
S1 Accelerator Sensor (Output Sensor)
S2 Brake Sensor (Output Sensor)

What is claimed is:

1. A drive control system mounted on a vehicle configured to travel by operation of a driver, comprising:
   an actuator configured to output a driving force for the vehicle to travel;
   an output sensor configured to detect a requested driving force requested by the operation of the driver; and
   a control device configured to:
      determine a response characteristic of the actuator;
      calculate a requested output value according to the requested driving force, the requested output value having a first inclined output waveform indicating a requested temporal change in the driving force;
      calculate a target output value by adding a given delay time to the requested output value, the target output value having a second inclined output waveform indicating a targeted temporal change in the driving force, the second inclined output waveform having a slope substantially coinciding with a slope of the first inclined output waveform of the requested output value; and
      control an operation of the actuator to cause the actuator to output a target driving force based on the requested driving force detected by the output sensor and the response characteristic,
   wherein the control device controls the actuator to cause the actuator to output the target driving force by outputting the calculated target output value based on the response characteristic, including the targeted temporal change in the driving force which is indicated by the second inclined output waveform.

2. The drive control system of claim 1,
   wherein the actuator is one of a plurality of actuators, and
   wherein the control device sequentially executes control of each of the plurality of actuators in an order according to a priority based on a given condition.

3. The drive control system of claim 2, wherein the given condition is set based on a restriction of one the plurality of actuators, a response of one the plurality of actuators, an execution accuracy of one the plurality of actuators, and an execution capability of one the plurality of actuators.

4. The drive control system of claim 1, wherein
the actuator is a first actuator configured to generate the driving force for the vehicle to travel, the drive control system further comprising:
a second actuator configured to adjust the driving force generated by the first actuator, wherein
the control device includes one or more processors configured to execute:
a request output setting module to set the requested output value corresponding to the requested driving force;
a target output setting module to set the target output value used as a target of the control by adding the given delay time to a timing of the requested output value set by the request output setting module;
a model predicting module to store a device model having the response characteristic corresponding to each of the first and second actuators, and perform an input-and-output operation corresponding to each of the first and second actuators by using the device model; and
an actual actuator controlling module to control the operation of each of the first and second actuators, and
the actual actuator controlling module causes each of the first and second actuators to output the target driving force corresponding to the target output value set by the target output setting module based on an input value obtained by carrying out an inverse operation by the model predicting module.

5. The drive control system of claim 4, wherein a priority of operation of each of the first and second actuators is set based on a given condition, and the model predicting module sequentially executes the input-and-output operation in an order according to the priority.

6. The drive control system of claim 5, wherein the given condition is set based on at least one of a restriction of the first or second actuator, a response of the first or second actuator, an execution accuracy of the first or second actuator, and an execution capability of the first or second actuator.

7. The drive control system of claim 1, wherein
the response characteristic includes a temperature-response relationship between a temperature condition of the actuator and a response time of the actuator to output the driving force; and
the control device is configured to change the given delay time based on a detected temperature condition of the actuator, according to the temperature-response relationship.

8. The drive control system of claim 1, wherein the actuator is selected from the group consisting of an engine, drive motor, clutch, transmission, differential, and brake.

9. The drive control system of claim 7, wherein the control device is configured to change the given delay time by:
acquiring current temperature information relating to the actuator;
calculating an estimated amount of change in the output of the actuator based on the current temperature information based upon the temperature-response relationship; and
upon determining that the estimated amount of change in the output of the actuator is above a predetermined cognitive threshold time period, changing the given delay time to be less than or equal to the predetermined cognitive threshold time period.

10. The drive control system of claim 9, wherein the predetermined cognitive threshold time period is between 100 milliseconds and 200 milliseconds.

11. The drive control system of claim 1, wherein
the response characteristic includes a pressure-response relationship between an atmospheric pressure condition of the actuator and a response time of the actuator to output the driving force; and
the control device is configured to change the given delay time based on a detected atmospheric pressure condition of the actuator, according to the pressure-response relationship.

12. The drive control system of claim 11, wherein the actuator is an engine.

13. The drive control system of claim 11, wherein the control device is configured to change the given delay time by:
acquiring current atmospheric pressure information relating to the actuator;
calculating an estimated amount of change in the output of the actuator based on the current atmospheric pressure information based upon the pressure-response relationship; and
upon determining that the estimated amount of change in the output of the actuator is above a predetermined cognitive threshold time period, changing the given delay time to be less than or equal to the predetermined cognitive threshold time period.

14. The drive control system of claim 13, wherein the predetermined cognitive threshold time period is between 100 milliseconds and 200 milliseconds.

15. A drive control method for use with an actuator configured to output a driving force for a vehicle to travel, the drive control method comprising:
determining a response characteristic of the actuator;
detecting the driving force requested by an operation of a driver of the vehicle, via an output sensor;
calculating a requested output value at a current timing corresponding to a requested driving force, the requested output value having a first inclined output waveform indicating a requested temporal change in the driving force;
calculating a target output value by adding a given delay time to the requested output value, the target output value having a second inclined output waveform indicating a targeted temporal change in the driving force, the second inclined output waveform having a slope substantially coinciding with a slope of the first inclined output waveform of the requested output value; and
controlling an operation of the actuator to cause the actuator to output a target driving force based on the requested driving force detected by the output sensor and the determined response characteristic,
wherein the actuator is controlled to cause the actuator to output the target driving force by outputting the calculated target output value based on the determined response characteristic of the actuator, including the targeted temporal change in the driving force which is indicated by the second inclined output waveform.

16. The drive control method of claim 15, wherein
the actuator is one of a plurality of actuators;
control of each of the plurality of actuators is sequentially executed in an order according to a priority based on a given condition; and
wherein the given condition is set based on a restriction of one the plurality of actuators, a response of one the plurality of actuators, an execution accuracy of one the plurality of actuators, and an execution capability of one the plurality of actuators.

17. The drive control method of claim 15, wherein
the actuator is a first actuator configured to generate the driving force for the vehicle to travel, a second actuator being provided to adjust the driving force generated by the first actuator, and wherein the method further comprises:
- setting the requested output value corresponding to the requested driving force;
- setting the target output value used as a target of the control by adding the given delay time to a timing of the requested output value;
- storing a device model having a response characteristic corresponding to each of the first and second actuators;
- performing an input-and-output operation corresponding to each of the first and second actuators by using the device model; and
- controlling the operation of each of the first and second actuators, such that each of the first and second actuators outputs the target driving force corresponding to the target output value based on an input value obtained by carrying out an inverse operation of the input-and-output operation.

18. The drive control method of claim 15, wherein the response characteristic includes a temperature-response relationship between a temperature condition of the actuator and a response time of the actuator to output the driving force and/or a pressure-response relationship between an atmospheric pressure condition of the actuator and the response time of the actuator to output the driving force, the method further comprising:
- changing the given delay time based on a detected temperature condition and/or a detected pressure condition of the actuator, according to the temperature-response relationship and/or the temperature-response relationship.

19. The drive control method of claim 18, wherein changing the given delay time is accomplished at least in part by:
- acquiring current temperature information and/or current pressure information relating to the actuator;
- calculating an estimated amount of change in the output of the actuator based on the current temperature information and/or current pressure information based upon the temperature-response relationship and/or the pressure-response relationship; and
- upon determining that the estimated amount of change in the output of the actuator is above a predetermined cognitive threshold time period, changing the given delay time to be less than or equal to the predetermined cognitive threshold time period.

* * * * *